Patented Jan. 4, 1927.

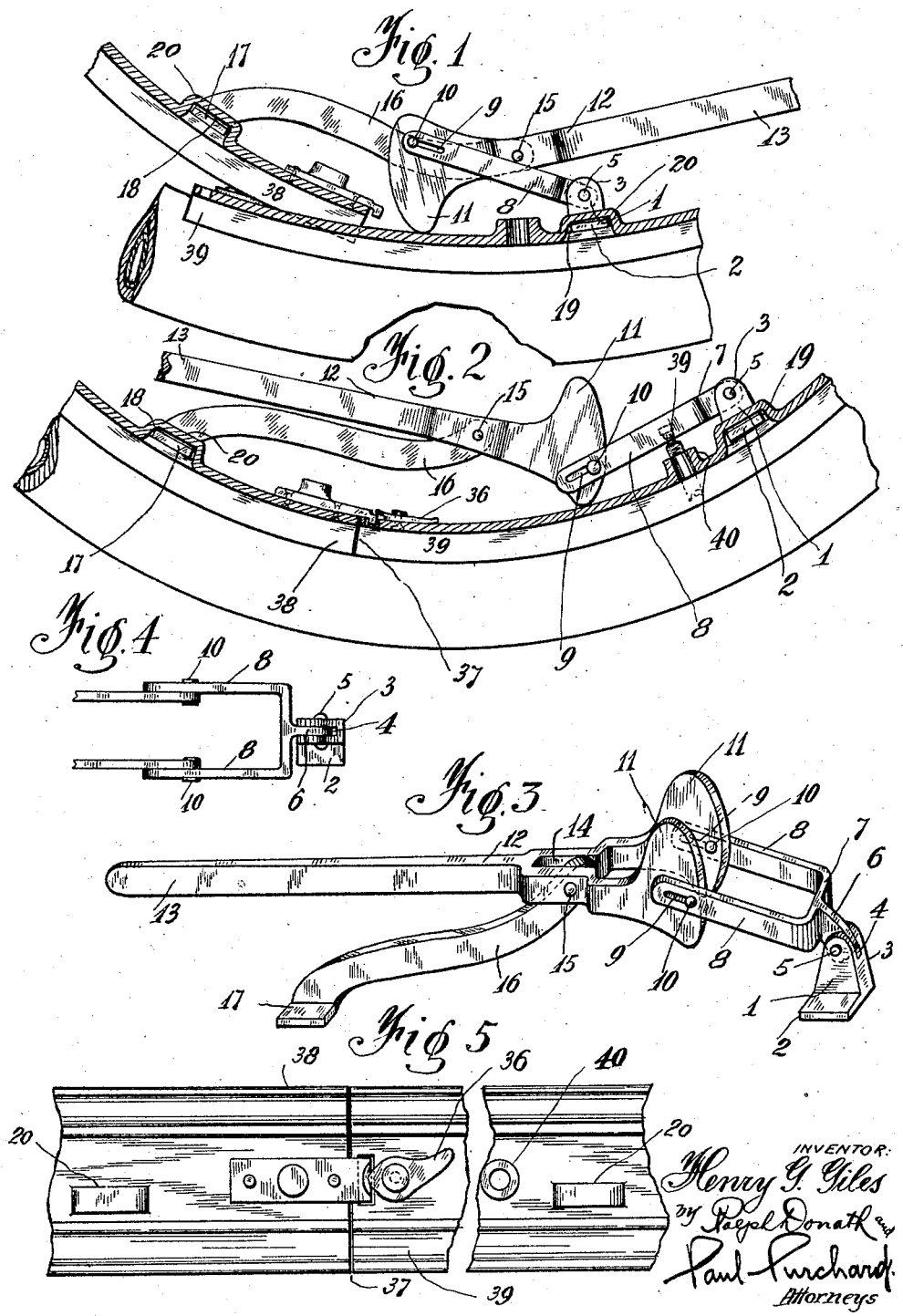

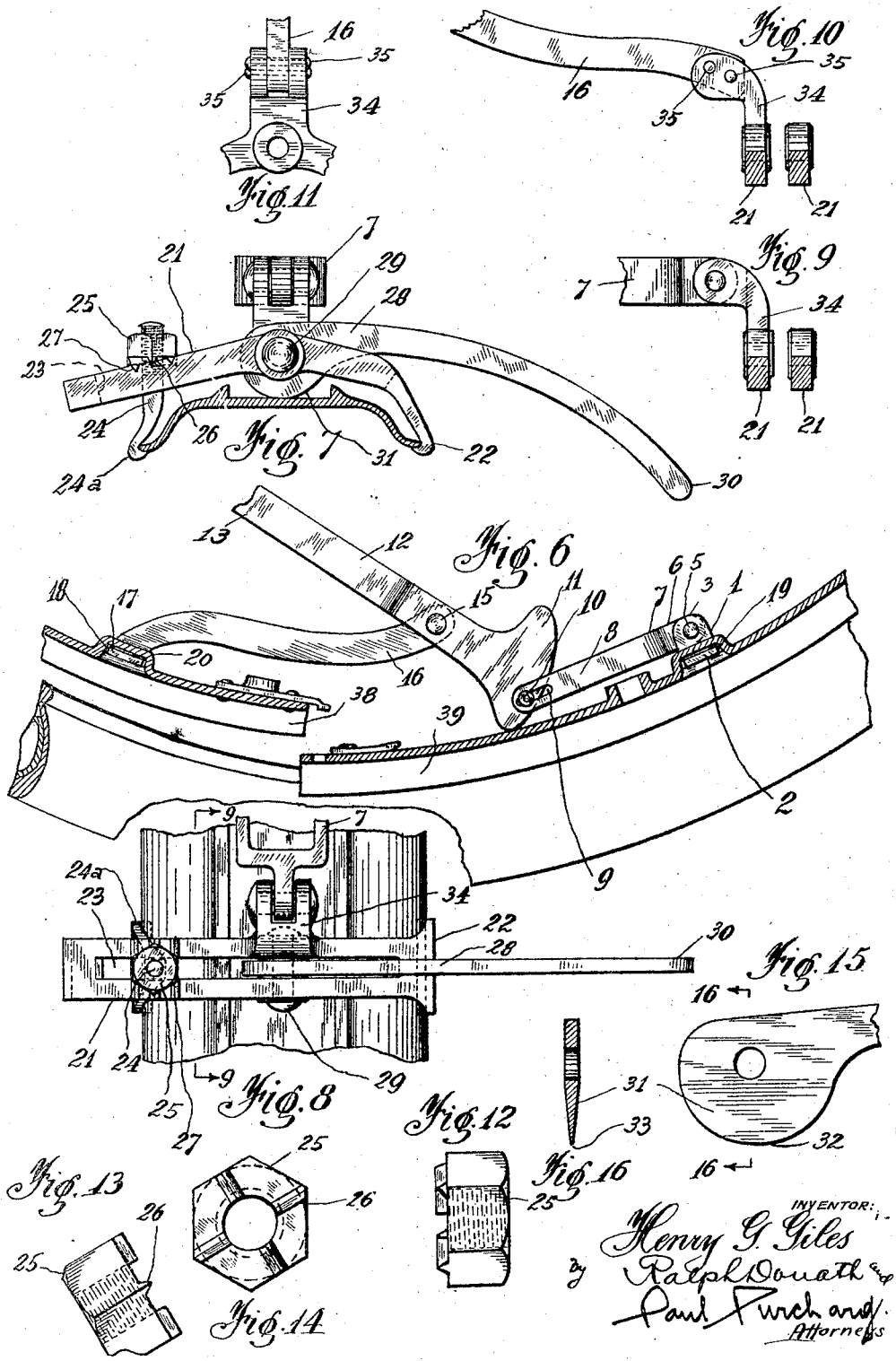

1,613,389

UNITED STATES PATENT OFFICE.

HENRY G. GILES, OF PITTSBURGH, PENNSYLVANIA, ASSIGNOR OF ONE-HALF TO WILLIAM H. McFARLAND, OF PITTSBURGH, PENNSYLVANIA.

TIRE MOUNTING AND DISMOUNTING DEVICE.

Application filed September 21, 1925. Serial No. 57,564.

This invention relates to tire mounting and dismounting devices especially adapted for pneumatic automobile tires mounted on split rims.

The primary object of this invention is to provide a tire mounting and dismounting device which is adapted for use on all commercial split rims now in use. Another object is to provide such a device which is adapted to automatically lift one end of a split rim above the other prior to overlapping said ends for the purpose of constricting the rim a sufficient amount to enable the mounting or dismounting of a tire on said rim. A further object is to provide a device which is relatively small and light and which, therefore, is well suited to be carried as part of the tool equipment of every automobile. Still a further object is to provide a device which is simple in operation and which is self-locking when the tire rim is constricted to its full required amount. Additional features and advantages of this invention will appear from the following description considered in connection with the accompanying drawings forming a part of this application and in which:

Fig. 1 is a fractional view of a rim as fully constricted by my device.

Fig. 2 shows the application of my device to a tire-rim prior to constricting the latter.

Fig. 3 is a perspective view of the tire mounting and dismounting device.

Fig. 4 is a fractional view showing the stationary end of the device.

Fig. 5 is fractional view of a modified tire-rim adapted especially to my device.

Fig. 6 is a view showing how one end of a rim is lifted above the other end thereof prior to overlapping said ends.

Fig. 7 is a front elevation of a universal clamp which permits of the use of my device to rims of various widths and cross sections.

Fig. 8 is a fractional top plan view of Fig. 7.

Fig. 9 is a fractional view of a section taken on line 9—9 in Fig. 8.

Fig. 10 is a similar view to Fig. 9 but taken on the universal clamp which is fastened on the moving end of the tire rim showing also a portion of the lifting link securely fastened to the clamp.

Fig. 11 is a fractional front elevation of Fig. 10.

Figs. 12 to 14 show various views of a special nut used in connection with the universal clamp.

Fig. 15 is a fractional view of the fulcrum-end of the clamping-lever of the universal clamp.

Fig. 16 is a section taken on line 16—16 in Fig. 15.

Referring to the various drawings, the preferred construction of my device, as shown especially in Fig. 3, comprises the anchor block 1 having the flat rectangular tongue 2 and the body 3 in the bifurcation 4 of which is rockably mounted on a pin 5 the tail end 6 of the forked-link 7 having at the outer end of each of its legs 8 a closed slot 9 of a predetermined length for a purpose to be discribed later.

Within the forked-link are hingedly mounted on pins 10, engaging the slots 9 and longitudinally movable therein, the two parallel and identical cams 11 of the operating lever 12 in which is provided intermediate said cams and the handle 13 a narrow bight 14 which is open towards the cams and in which is hinged on a pin 15 the lifting-link 16. The latter is preferably given the shape of a reverse-curve shown in the various figures and is provided at the free end with a rectangular tongue 17 disposed at right angles to the link and pointing in the same direction as the tongue 2.

These two tongues are adapted to engage similarly shaped catches 18 and 19 provided near each end of the tire rim. In the drawings these catches are shown as being formed by striking out a portion 20 of the rim; but, if desired, such catches might be provided by riveting or welding suitably shaped strips of metal on the inner side of the rim. The latter process of making the catches may be found preferable when adapting old tire-rims to the device.

As stated, the preferred construction just described requires the provision of catches on the tire rims. This feature may prove objectional when the device is to be made use of in public garages where rims of various designs and sizes are to be handled. To render the device universal in its application, I provide it with two universal rim-clamps whereby to secure the device to each end of the tire-rim. The construction of these clamps is illustrated in Figs. 7 to 11.

As shown therein, each clamp consists of a yoke member 21 having one of its ends bent downwardly and provided with a hook 22 adapted to engage one flange of the tire rim. This yoke is provided with a long central and closed slot 23 of ample width to slidably accommodate a bolt 24 the lower end of which has a hook 24ᵃ to grip the opposite flange of the tire rim. This hook-bolt is held in the slot by means of a nut 25 having provided on its under side triangular ribs 26 adapted to engage suitable notches 27 cut in the upper part of the yoke and whereby the hook-bolt is prevented from slipping. A clamping-lever 28 is hingedly mounted within the slot 23 by means of a fulcrum-pin 29. This lever is composed of a handle 30 and a cam-portion 31 which is eccentrically disposed to the fulcrum-pin in such a manner as to cause the extreme periphery 32 of the cam to engage the inner side of the tire-rim.

To prevent slipping of the universal clamps due to the tension acting thereon when the tire rim is constricted, the lower and extreme periphery of each cam is preferably ground to a fairly sharp edge 33, as shown in Fig. 16, to enable said cam to dig itself slightly into the tire-rim.

Each yoke is provided with an upward extension 34 which is bifurcated at the top. In one of said extensions is hingedly mounted the forked link 7 and in the other extension is permanently and rigidly secured the lifting-link 16 in any desired manner, such as by the rivets 35 shown in Figs. 10 and 11.

Having described the various parts of my device, its method of application and operation will be readily understood and may be succinctly described as follows:

Assuming that a tire is to be mounted on or removed from a rim of a type shown especially in Figs. 5 and 6, the rim-lock 36 is first opened and my device is then mounted inside the rim by inserting the tongues 2 and 17 in their respective catches 19 and 18, so that the condition illustrated in Fig. 2 is obtained. It will be seen therein that the handle 13 of the operating lever 12 lies substantially level to the left-side of the rim-split 37 and that the pins 10 of the cams 11 occupy the rear ends of the slots 9 in the forked-link 7. The operating lever 12 is now given a clock-wise rotation which causes the pins 10 to travel forward in the slots 9. Owing to the rectangular shape of the tongue 17 and its catch 18, the lifting link 16 is forced to rise up in accord with the upward travel of the hinge-pin 15 and therefore the left end 38 of the tire-rim is raised above the substantially immobile rim-end 39. Any binding movement of the rim-end 38 against the face of the rim end 39 is prevented by properly dimensioning the length of the slots 9. As the left rim-end has reached the required height to fully clear the other rim-end, the pins 10 have about reached the front end of the slots 9, as shown in Fig. 6. Any further clockwise rotation of the operating lever will now cause the latter to rotate around the pins 10 as a fulcrum whereby the lifting link will be moved to the right by the rotation of its fulcrum 15 and the left rim-end 38 will assume the overlapping and final position shown in Fig. 1.

Reference to this figure will show that the fulcrum pins 10 lie well above the point of application 15 of the considerable tension existing in the constricted end of the rim, so that this very tension will keep on rotating the operating lever until its handle 13 strikes the inner side of the rim.

The device is therefore safely locked against rebound and the rim sufficiently constricted to permit the easy mounting or dismounting of a tire.

When a new tire has been mounted, the operating lever is first lifted out of its self-locking position after which the tension in the left rim end will force the latter back into normal position. Should this rim-end fail to reach its normal position, owing to a slight loss in resiliency, this deficiency will be readily overcome by pressing down on the operating lever which now has again resumed the position shown in Fig. 2. Any counter-clock-wise rotation now exerted on this lever will cause the pins 10 to strike the rear ends of the slots 9 and move the lifting-links 16 and the rim end 38 to the left until the latter has resumed its normal position.

The operation of my universal device varies from the above description only in that the clamps must be properly secured on each end of the tire rim. This is done by first placing the hooks on the yoke and hook-bolt over the flanges of the rim and then securing said clamps by pressing down the clamping lever, as will be readily understood. This being done, the operations remaining to be performed are identical to the ones described above.

The reason for providing two spaced parallel cams on the operating lever 12 and the forked-link 7 is to enable these parts to straddle the tire valve 39 and its hub provided on the rim. As is well known to those versed in the art, the location of the tire valve varies in different makes of tire-rims, some of them having the valve hub 40 very close to the rim-split as shown in the drawings. This position would interfere with the proper operation of my device if but a single cam and simple lever 7 were used in the middle of the rim.

As will be understood, as suggested herein, there may be slight changes made in the construction and arrangement of the details of my invention without departing from the field and scope of the same, and I intend to include all variations, as fall within the scope of the appended claims, in this application in which the preferred forms only of my invention are disclosed.

I claim:—

1. In a device for mounting and dismounting a tire on a split tire-rim, an anchor, means for securing said anchor to one end of said rim; a forked link hingedly connected to said anchor; said link having an oblong slot positioned adjacent the free end of each leg thereof; an operating lever comprising a handle and a pair of identical cams disposed in spaced and parallel relation; a pin secured in each of said cams and adapted to slidably engage one of said slots; a lifting-link hingedly connected at one end to said operating lever; and means for securing the other end of said lifting-link to the other end of said tire-rim, said means being adapted to prevent the rotation therein of the unhinged end of said lifting-link.

2. In a device for mounting and dismounting a tire on a split-rim, an anchor; means for removably securing said anchor to one end of said rim; a forked link hingedly connected to said anchor; said link having an oblong slot positioned adjacent the free end of each leg thereof; an operating lever comprising a handle and a pair of identical cams disposed in spaced parallel relation and adapted to engage the inside periphery of the rim; a pin secured in each of said cams and adapted to slidably engage one of said slots; a lifting-link; a pin hingedly connecting one end of said lifting-link to said operating lever; means for removably securing the other end of said lifting-link to the other end of said tire-rim, said means being adapted to prevent the rotation therein of the unhinged end of said lifting-link; the length of said oblong slots being adapted to permit the raising of one of said rim ends above the other end prior to overlapping said raised end over said other end and the relative position of pins in the cams of said operating lever and the pin in the lifting-link being such as to render said device self-locking when said rim is fully constricted.

In testimony whereof I affix my signature.

HENRY G. GILES.